(12) United States Patent
Frias et al.

(10) Patent No.: US 12,187,074 B2
(45) Date of Patent: Jan. 7, 2025

(54) WHEEL ANTI-THEFT DEVICE

(71) Applicants: Patrick Frias, Albuquerque, NM (US); Dan Frias, Albuquerque, NM (US)

(72) Inventors: Patrick Frias, Albuquerque, NM (US); Dan Frias, Albuquerque, NM (US)

( * ) Notice: Subject to any disclaimer, the term of this patent is extended or adjusted under 35 U.S.C. 154(b) by 426 days.

(21) Appl. No.: 17/829,229

(22) Filed: May 31, 2022

(65) Prior Publication Data

US 2022/0379656 A1 Dec. 1, 2022

Related U.S. Application Data

(60) Provisional application No. 63/195,132, filed on May 31, 2021.

(51) Int. Cl.
*B60B 7/16* (2006.01)
*B60B 7/04* (2006.01)

(52) U.S. Cl.
CPC . *B60B 7/16* (2013.01); *B60B 7/04* (2013.01)

(58) Field of Classification Search
CPC .. B60B 7/16; B60B 7/04; B60B 37/04; B60B 37/06; B60B 37/10
See application file for complete search history.

(56) References Cited

U.S. PATENT DOCUMENTS

| | | | | |
|---|---|---|---|---|
| 2,328,301 A * | 8/1943 | Shaw, Jr. | ............... | B60B 7/16 301/37.21 |
| 3,170,733 A * | 2/1965 | Lamme | ............... | B60B 7/16 301/37.38 |
| 3,426,561 A * | 2/1969 | Kinait | ............... | B60B 7/16 70/259 |
| 3,534,570 A * | 10/1970 | Mauro | ............... | E05B 83/24 70/230 |
| 3,918,764 A * | 11/1975 | Lamme | ............... | B60B 7/16 301/37.21 |
| 7,988,239 B1 * | 8/2011 | Baker | ............... | B60B 7/20 301/37.371 |
| 8,943,865 B1 * | 2/2015 | Bullock | ............... | B60B 7/02 70/225 |
| 10,744,817 B2 * | 8/2020 | Chen | ............... | B60B 3/147 |
| 2021/0229489 A1 * | 7/2021 | Ivarsson | ............... | B60B 7/04 |

* cited by examiner

*Primary Examiner* — Jason R Bellinger
(74) *Attorney, Agent, or Firm* — Kameron W. Kramer

(57) ABSTRACT

A wheel anti-theft apparatus includes a base plate and an outer plate. The base plate includes a locking pin and stud holes, and the outer plate includes lug nut security sleeves and a locking pin receiver. Studs located on a vehicle plate on a vehicle are inserted through the stud holes of the base plate. A wheel is then placed on the base plate with the studs extending through the stud holes of the wheel. The locking pin extends through the center of the wheel. Lug nuts are screwed onto the studs to secure the wheel onto the vehicle plate and the base plate. The outer plate is placed on the wheel. The lug nut security sleeves fit over the lugs nuts and the locking pin is disposed in the locking pin receiver.

15 Claims, 3 Drawing Sheets

WHEEL ANTI-THEFT DEVICE

CROSS-REFERENCE TO RELATED APPLICATION

This application claims the benefit of U.S. Provisional Patent Application Ser. No. 63/195,132 filed May 31, 2021, titled "WHEEL ANTI-THEFT DEVICE," and the subject matter thereof is incorporated herein by reference thereto.

TECHNICAL FIELD

The present invention relates to an anti-theft device, and more specifically to a wheel anti-theft device for externally-mounted wheels on vehicles.

BACKGROUND ART

Externally-mounted spare wheels on vehicles, trailers, or other apparatus are susceptible to theft. There are various locking devices that are used to lock externally-mounted spare wheels. Lug nuts fasten a wheel's hub to threaded wheel studs on the vehicle, securing the wheel in place. Typical locking mechanisms lock one of the lugs in place, thus securing the wheel from being removed from the vehicle.

However, the devices in the prior art have various shortcomings. Specifically, the prior art devices do not protect the lug nuts from theft. Additionally, some of the prior art devices can cause damage to the existing lug nuts. Locking one lug nut in place can potentially cause problems if a person tries to steal the spare wheel because it creates only one part where the wheel is secured/locked to the car, and if someone removes the other lug nuts, leaving only the locked lug nut, if a person was to pull really hard on the tire, it could twist and create torque, resulting in damage to both the rim and the car.

Despite the abundance of spare wheel locks, there is a shortage of devices that provide an easy to use and secure locking device that protects all lug nuts for externally mounted wheels. The present invention overcomes the shortcoming contained in the prior art by providing such a device that provides all of those features. The present invention is easy to use, sturdy, reliable, secure, and relatively cheap.

Certain embodiments of the invention have other steps or elements in addition to or in place of those mentioned above. The steps or elements will become apparent to those skilled in the art from a reading of the following detailed description when taken with reference to the accompanying figures.

None of the prior art fully addresses the problems resolved by the present invention. The present invention overcomes these limitations contained in the prior art by providing a locking device that protects all lug nuts for externally mounted wheels that is easy to use, sturdy, reliable, secure, and relatively cheap.

DETAILED DESCRIPTION OF THE INVENTION

Figure 1:
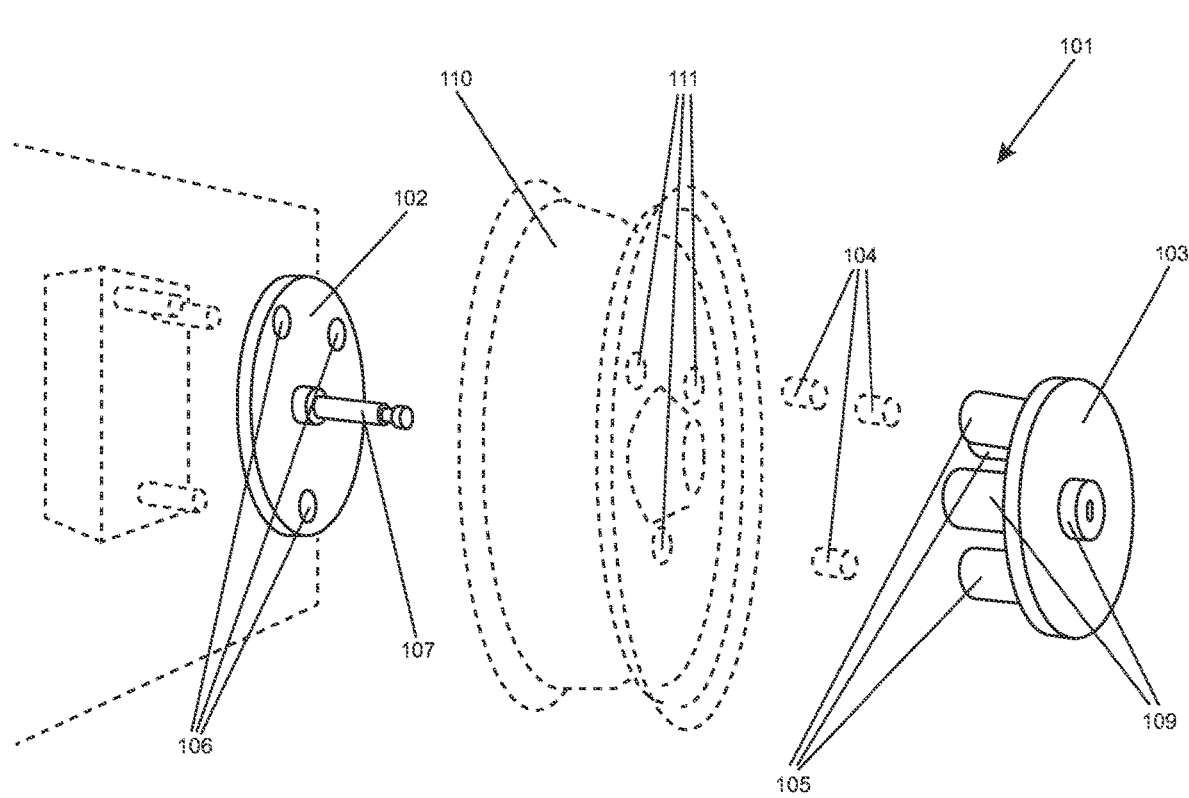
FIG. 1 illustrates a perspective view of the wheel anti-theft device of the present invention.

The best mode for carrying out the invention will be described herein. The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. To avoid obscuring the present invention, some well-known system configurations, and process steps are not disclosed in detail. The figures illustrating embodiments of the system are semi-diagrammatic and not to scale and, particularly, some of the dimensions are for the clarity of presentation and are shown exaggerated in the drawing figures.

Alternate embodiments have been included throughout, and the order of such are not intended to have any other significance or provide limitations for the present invention.

For expository purposes, the term "horizontal" as used herein is defined as a plane parallel to the plane or surface of the present apparatus, regardless of its orientation. The term "vertical" refers to a direction perpendicular to the horizontal as just defined. Terms, such as "above", "below", "bottom", "top", "side", "higher", "lower", "upper", "over", and "under", are defined with respect to the horizontal plane, as shown in the figures. The term "on" means that there is direct contact among elements.

The present invention provides an easy to use and secure locking device that secures externally-mounted wheels on vehicles.

FIG. 1 shows a perspective view of wheel anti-theft device 101 of the present invention. Base plate 102 comprises locking pin 107 and stud holes 106. Stud holes 106 extend through base plate 102. Outer plate 103 comprises lug nut security sleeves 105 and locking pin receiver 109. Lug nuts 104, wheel 110, and wheel stud holes 111 are shown, but do not make up part of the present invention. Wheel stud holes 111 extend through wheel 110.

Locking pin receiver 109 extends through outer plate 103. Locking pin receiver 109 comprises an opening that allows for locking pin 107 to be disposed in. Locking pin receiver 109 further comprises a locking mechanism that allows locking pin receiver 109 to be securably attached to locking pin 107. Locking pin receiver 109 may comprise a key opening for the insertion of a key that controls the locking of the locking pin 107. Locking pin receiver 109 may comprise any type of locking mechanism that allows for locking pin 107 to be secured inside of locking pin receiver 109. Once locking pin 107 is securably coupled in locking pin receiver 109, outer plate 103, including lug nut security sleeves 105, are secured in place. Lug nut security sleeves 105 allow for lug nuts 104 to be securably inserted into.

Wheel anti-theft device 101 comprises base plate 102 and outer plate 103, wherein base plate 102 comprises locking pin 107 and stud holes 106, and wherein outer plate 103 comprises lug nut security sleeves 105 and locking pin receiver 109.

Figure 2:
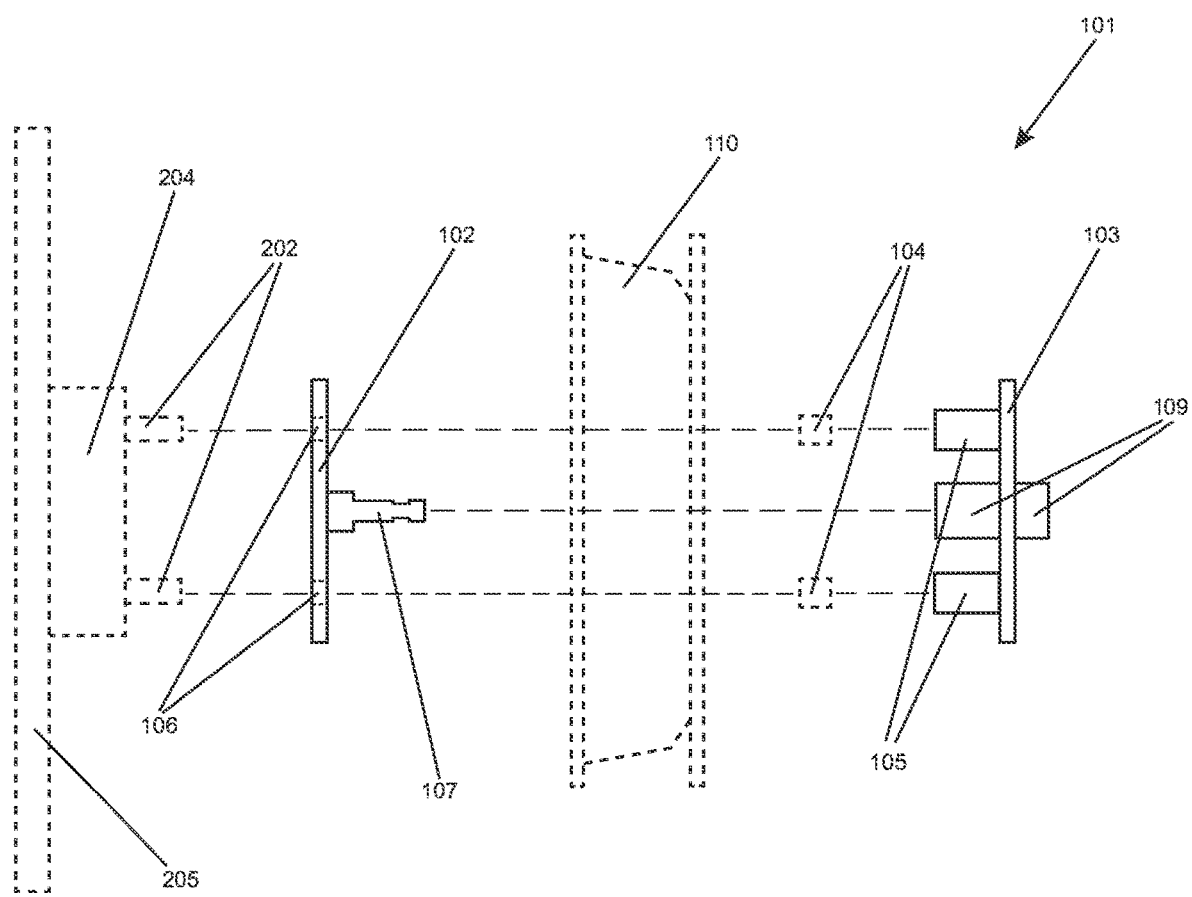
FIG. 2 illustrates a side view of wheel anti-theft device of the present invention.

FIG. 2 shows a side view of wheel anti-theft device 101 of the present invention. Vehicle plate 204 is disposed on vehicle 205 and is used to attach wheel 110 to vehicle 205. Vehicle plate 204 comprises studs 202. Studs 202 are inserted in stud holes 106, thus securing base plate 102 on vehicle plate 204. Wheel 110 is disposed on base plate 102, and studs 202 extend through wheel stud holes 111 in wheel 110. Locking pin 107 extends through wheel 110. Lug nuts 104 are disposed on studs 202 and screw down to secure wheel 110 via studs 202. Outer plate 103 is disposed on wheel 110, thus covering locking pin 107 and lug nuts 104. Lug nuts 104 after being screwed onto studs 202 are inserted into lug nut security sleeves 105. Locking pin 107 is inserted in locking pin receiver 109. Locking pin receiver 109 can be locked via key or other locking mechanism to secure wheel anti-theft device 101 in place, thus allowing wheel 110 to be safely stored.

Studs 202, vehicle plate 204, and vehicle 205 are shown, but do not make up part of the present invention.

Studs 202 are inserted through the stud holes 106 of the base plate 102 of wheel anti-theft device 101 of the present invention. Next, wheel 110 is disposed on the base plate 102 with studs 202 extending through wheel stud holes 111 of the wheel 110 and the locking pin 107 extends through the center of the wheel 110, wherein lug nuts 104 are screwed onto the studs 202, and outer plate 103 is disposed on the wheel 110, wherein the lug nut security sleeves 105 fit securely over the lug nuts 104 and locking pin 107 extends into the locking pin receiver 109.

The stud holes 106 of the base plate 102 are arranged in the same pattern as the lug nut security sleeves 105 of the outer plate 103. Further, the stud holes 106 of the base plate 102 are arranged in the same pattern as the studs on a vehicle.

When outer plate 103 is disposed on wheel 110, lug nuts 104 are secured in lug nut security sleeves 105, thus not allowing access to lug nuts 104. Lug nut security sleeves 105 only extend part way through outer plate 103. Locking pin receiver 109 extends through outer plate 103 and secures outer plate 103 to wheel 110 and base plate 102 when locking pin 107 is disposed in locking pin receiver 109. To access lug nuts 104 and locking pin 107, outer plate 103 must be removed.

Figure 3:
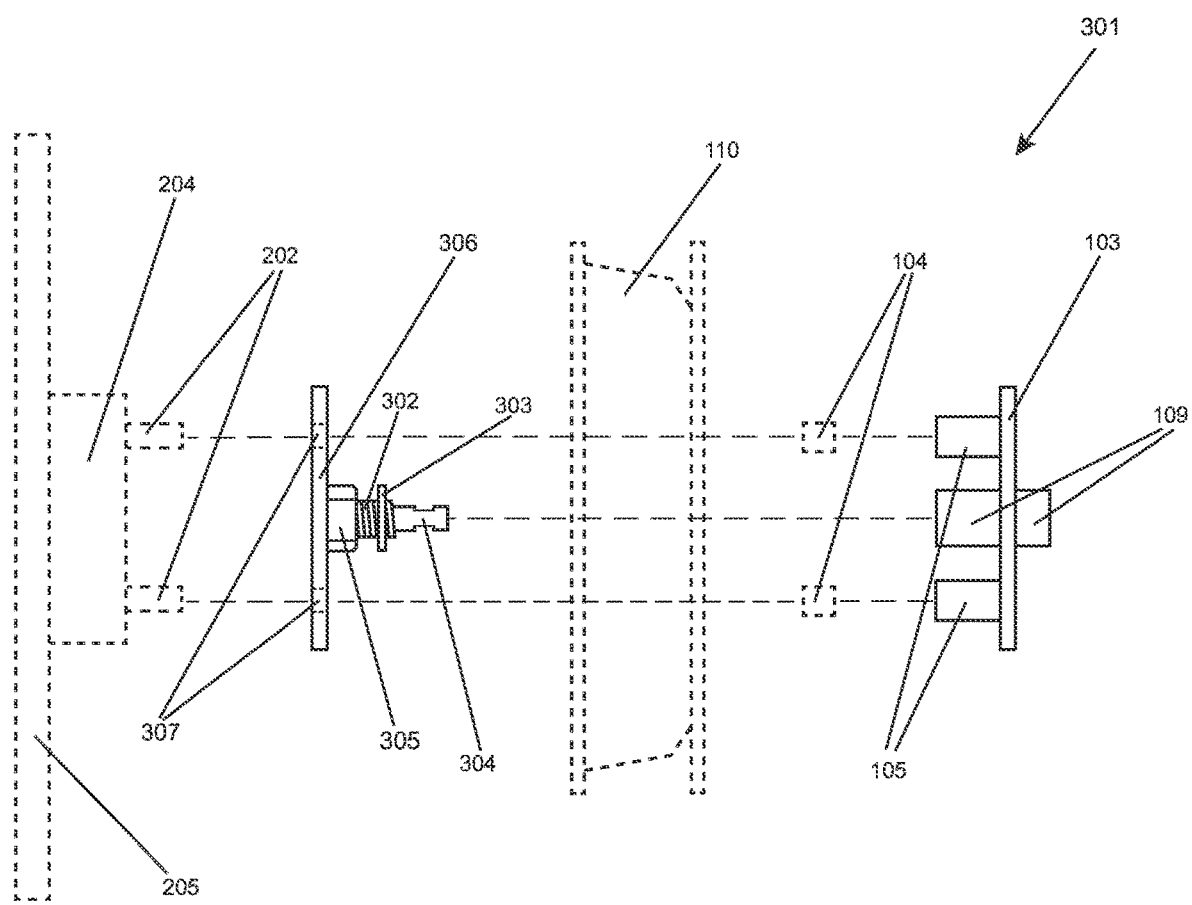
FIG. 3 illustrates a side view of an alternate embodiment of the present invention.

FIG. 3 shows a side view of an alternate embodiment of the wheel anti-theft device 301 of the present invention. Locking pin base 305 is securably disposed on adjustable base plate 306. Locking pin base 305 comprises a hole with threads to allow for the insertion of locking pin threads 302. Locking pin threads 302 securely thread into locking pin base 305, thus changing the relative length of locking pin threads 302. Adjustable locking pin 304 is disposed on locking pin threads 302, and acts the same way as locking pin 107. Locking pin adjuster 303 is a jam nut and is disposed on locking pin threads 302. The length of locking pin threads 302 can be changed by screwing the pin threads 302 toward or away from locking pin base 305. This in turn changes how far adjustable locking pin 304 is from adjustable base plate 306. When the desired position of locking pin threads 302 and adjustable locking pin 304 are achieved, locking pin adjuster 303 is rotated so that it comes into contact with locking pin base 305. This locks in the positions of locking pin threads 302 and adjustable locking pin 304.

Vehicle plate 204 is disposed on vehicle 205 and is used to attach wheel 110 to vehicle 205. Vehicle plate 204 comprises studs 202. Studs 202 are inserted in adjustable plate stud holes 307, thus securing adjustable base plate 306 on vehicle plate 204. Wheel 110 is disposed on adjustable base plate 306, and studs 202 extend through wheel stud holes 111 in wheel 110. Adjustable locking pin 304 extends through wheel 110. Lug nuts 104 are disposed on studs 202 and screw down to secure wheel 110 via studs 202. Outer plate 103 is disposed on wheel 110, thus covering adjustable locking pin 304 and lug nuts 104. Lug nuts 104 are inserted into lug nut security sleeves 105. Adjustable locking pin 304 is inserted in locking pin receiver 109. Adjustable locking pin 304 can be locked via key or other locking mechanism to secure wheel anti-theft device 101 in place, thus allowing wheel 110 to be safely stored.

The length of studs 202 and the thickness of wheel 110 can vary. The threaded hole of locking pin base 305 allows for the lengths of locking pin threads 302 and adjustable locking pin 304 to be changed as desired by turning locking pin threads 302. Locking pin adjuster 303 is then turned so that in comes into contact with locking pin base 305. Adjustable locking pin 304 is then securely inserted in locking pin receiver 109 at the correct depth, thus securing wheel 110. By adjusting the distance between the distal end of adjustable locking pin 304 and locking pin base 305, this ensures that adjustable locking pin 304 is in direct contact with locking pin receiver 109.

Studs 202 are inserted through the adjustable plate stud holes 307 of the adjustable base plate 306 of wheel anti-theft device 301 of the present invention. Next, wheel 110 is disposed on the adjustable base plate 306 with studs 202 extending through wheel stud holes 111 of wheel 110 and the adjustable locking pin 304 extends through the center of wheel 110, wherein lug nuts 104 are screwed onto studs 202, and outer plate 103 is disposed on wheel 110, wherein the lug nut security sleeves 105 fit securely over the lug nuts 104 and adjustable locking pin 304 extends into the locking pin receiver 109.

In another embodiment of the present invention, the wheel anti-theft apparatus comprises a base plate and an outer plate, wherein the base plate comprises a locking pin and stud holes, and wherein the outer plate comprises lug nut holes and locking pin receiver. The studs are inserted through the stud holes of the base plate, a wheel is disposed on the base plate with the studs extending through the stud holes of the wheel and the locking pin extending through the center of the wheel, wherein lug nuts are screwed onto the studs, and outer plate is disposed on the wheel, wherein the lug nuts are inserted through the lug nut holes and locking pin extends into the locking pin receiver. Lug nut holes extend through the outer plate.

Locking pin 107 and locking pin receiver 109 comprise any type of locking mechanism. Locking mechanism may comprise wireless, keyless, fingerprint scanner, etc. means for unlocking. Locking pin 107 and locking pin receiver 109 may comprise an electronic locking and unlocking mechanism.

The device of the present invention may comprise any number of stud holes 106 and/or lug nut security sleeves 105 in any placement or size to fit any vehicle.

When the wheel is removed, the device of the present invention can remain in place on the vehicle by simply locking the locking pin 107 disposed in the locking pin receiver 109. Lug nuts 104 are disposed on studs 202 for safekeeping.

The present invention can be used to secure wheels on studs that are attached to any number of devices, not just vehicles.

In another embodiment of the present invention, the inside of lug nut security sleeves 105 comprise foam or other material that will not scratch wheel or lug nuts.

The best mode for carrying out the invention has been described herein. The previous embodiments are described in sufficient detail to enable those skilled in the art to make and use the invention. It is to be understood that other embodiments would be evident based on the present disclosure, and that system, process, or mechanical changes may be made without departing from the scope of the present invention.

In the previous description, numerous specific details and examples are given to provide a thorough understanding of the invention. However, it will be apparent that the invention may be practiced without these specific details and specific examples. While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters previously set forth herein or shown in the accompanying drawings are to be interpreted in an illustrative and non-limiting sense.

What is claimed is:

1. A wheel anti-theft apparatus comprising:
   a base plate; and
   an outer plate;
   wherein the base plate comprises a locking pin and stud holes, and
   wherein the outer plate comprises lug nut security sleeves and a locking pin receiver.

2. The wheel anti-theft apparatus of claim 1, wherein studs are inserted through the stud holes of the base plate, a wheel is disposed on the base plate with the studs extending through the stud holes of the wheel and the locking pin extending through the center of the wheel, wherein lug nuts are screwed onto the studs, and outer plate is disposed on the wheel, wherein the lug nut security sleeves fit over the lug nuts and the locking pin extends into the locking pin receiver.

3. The wheel anti-theft apparatus of claim 1, wherein the locking pin receiver comprises a locking mechanism.

4. The wheel anti-theft apparatus of claim 1, wherein the base plate is installed on the studs of a vehicle.

5. The wheel anti-theft apparatus of claim 1, wherein the base plate is installed on the studs of a vehicle plate.

6. The wheel anti-theft apparatus of claim 1, wherein the base plate is installed on the studs of a plate.

7. The wheel anti-theft apparatus of claim 1, wherein the stud holes of the base plate are arranged in the same pattern as the lug nut security sleeves of the outer plate.

8. The wheel anti-theft apparatus of claim 1, wherein the stud holes of the base plate are arranged in the same pattern as the studs on a vehicle.

9. The wheel anti-theft apparatus of claim 1, wherein the lug nut security sleeves only extend part way through outer plate.

10. The wheel anti-theft apparatus of claim 1, wherein the locking pin receiver comprises a key hole.

11. A wheel anti-theft apparatus comprising:
    an adjustable base plate; and
    an outer plate;
    wherein the adjustable base plate comprises locking pin threads, a locking pin adjuster, an adjustable locking pin, a locking pin base, and adjustable plate stud holes, and
    wherein the outer plate comprises lug nut security sleeves and a locking pin receiver.

12. The wheel anti-theft apparatus of claim 11, wherein the studs are inserted through the adjustable plate stud holes of the adjustable base plate, the wheel is disposed on the adjustable base plate with the studs extending through the stud holes of the wheel and the adjustable locking pin extending through the center of the wheel, wherein lug nuts are screwed onto the studs, and the outer plate is disposed on the wheel, wherein the lug nut security sleeves fit over the lug nuts and the adjustable locking pin extends into the locking pin receiver.

13. The wheel anti-theft apparatus of claim 11, wherein the locking pin base comprises a hole with threads to allow for the insertion of the locking pin threads.

14. The wheel anti-theft apparatus of claim 11, wherein the locking pin threads are turned in order to change the distance of the adjustable locking pin from the adjustable base plate.

15. The wheel anti-theft apparatus of claim 11, wherein the locking pin adjuster is turned so that the locking pin adjuster comes into contact with the locking pin base.

\* \* \* \* \*